US011947051B2

(12) United States Patent
Newkirk et al.

(10) Patent No.: US 11,947,051 B2
(45) Date of Patent: Apr. 2, 2024

(54) SENSOR CALIBRATION SET-UP TOOL WITH ANGULAR OFFSET FUNCTIONALITY

(71) Applicant: Robert Bosch GmbH, Stuttgart (DE)

(72) Inventors: Dan Newkirk, Owatonna, MN (US); Jeremy Harmer, Austin, MN (US); Eric Wuchte, Casco, MI (US); James Baum, Waterford, MI (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 767 days.

(21) Appl. No.: 17/085,062

(22) Filed: Oct. 30, 2020

(65) Prior Publication Data

US 2022/0137199 A1    May 5, 2022

(51) Int. Cl.
  *G01S 7/48*      (2006.01)
  *G01B 11/275*    (2006.01)
  *G01D 18/00*     (2006.01)
  *G01S 7/497*     (2006.01)
  *G01S 17/931*    (2020.01)
  *H04N 17/00*     (2006.01)
(52) U.S. Cl.
  CPC ........ *G01S 7/4972* (2013.01); *G01B 11/2755* (2013.01); *G01D 18/00* (2013.01); *G01S 17/931* (2020.01); *H04N 17/002* (2013.01); *B60R 2300/105* (2013.01); *B60R 2300/301* (2013.01); *B60R 2300/8093* (2013.01)

(58) Field of Classification Search
None
See application file for complete search history.

(56) References Cited

U.S. PATENT DOCUMENTS

| 10,323,936 B2 | 1/2019 | Leikert |
| 2019/0004147 A1 | 1/2019 | Conrad et al. |
| 2019/0064320 A1 | 2/2019 | Zack et al. |
| 2019/0101384 A1 | 4/2019 | Zack |
| 2019/0187249 A1 | 6/2019 | Harmer et al. |

FOREIGN PATENT DOCUMENTS

| WO | 2019162296 | 8/2019 |
| WO | 2019206633 | 10/2019 |

*Primary Examiner* — Hovhannes Baghdasaryan
(74) *Attorney, Agent, or Firm* — David Kovacek (57) ABSTRACT

A set-up tool for aiding vehicle sensor calibrations having a structure with a first and second vehicle contact points configured to contact a vehicle and establish a calibration axis. A substantially vertically projected flat blade laser may be placed in a position perpendicular to the calibration axis and used to align the set-up tool with a center of the vehicle. Once centered, the laser ma be transitioned to project a laser line, in coordination with a protractor having a base-line parallel to the calibration axis (which is now substantially parallel to a transverse axis of the vehicle), at a discreet angle away from the center of the vehicle. A target may then be placed along the laser line to aid in the calibration of vehicle sensors.

20 Claims, 6 Drawing Sheets

SENSOR CALIBRATION SET-UP TOOL WITH ANGULAR OFFSET FUNCTIONALITY

TECHNICAL FIELD

This disclosure relates to calibration of vehicle sensors, and in particular vehicle sensors that may be utilized by an autonomous function of the vehicle.

BACKGROUND

Automotive vehicles may utilize one or more sensors to aid in navigating the surrounding environment, whether autonomously, semi-autonomously, or by proving information to a driver. In vehicles having an Advance Driver Assistance System, for example, the sensors may be proximity sensors which are used to identify an object near the vehicle and, in combination with a computing system, autonomously navigate around the object or inform the driver of the proximity of the object. In adaptive cruise control systems, the sensors identify the distance from one vehicle to another and automatically adjust the cruise speed of the following vehicle to ensure a safe following distance. An example of such a sensor is a radar sensor. Accordingly, vehicles having autonomous functionality, such that the vehicle may break or steer without input from a driver, the sensors effectively provide the field of vision for the vehicle and play an essential part of the navigation of the vehicle, thus the calibration of such sensors may be necessary to ensure proper functionality.

Sensors may require calibration for such autonomous systems to achieve optimum performance. Sensor calibration, or the testing of the sensor to ensure it is within proper operating specifications, may be required as part of regular maintenance to ensure safety of such autonomous systems. Sensor calibration may also be required after a repair of the vehicle, such as a replacement of a windshield or other body components of the vehicle which house or support the sensors. Current calibration tools are typically bulky and stationary, and require the vehicle to be brought into an automotive service center or similar controlled environment. As vehicles become more and more autonomous, it is envisioned that a vehicle with a faulty sensor may not be able to be driven safely (or may not be able to drive by itself) until the sensor is repaired, calibrated, or calibration is verified. In a scenario where the calibration equipment is large and bulky, or only available at a service repair center, would require the vehicle to be towed.

It is therefore desirable to have a calibration apparatus that is sufficiently mobile that the calibration procedure may be performed at a location outside of an automotive service center, such as in a parking lot, an owner's garage, along a road side, or wherever the vehicle is located when a calibration may be desired.

SUMMARY

One aspect of this disclosure is directed to a set-up tool for aiding vehicle sensor calibrations. In this aspect, the set-up tool has at least a cross member, a first contact member, a second contact member, a protractor structure, and a laser carrying structure. The cross member has a center region disposed between a first end region and a second end region. The first contact member is collected to and extends away from the first end region of the cross member. The first contact member also has a first portion configured to contact a vehicle. The second contact member is connected to and extends away from the second end region of the cross member. The second contact member also has a second portion configured to contact the vehicle. The first and second contact members, when in contact with the vehicle on a same side of the cross member, define a vehicle-facing side of the set-up tool. Then also, by such a contact with the vehicle, the first and second contact members define a field-facing side of the set-up tool, which is opposite the vehicle-facing side.

The protractor structure is substantially centered on the center region of the cross member. The protractor structure has a center point and provides measurable angular delineation from the center point outwardly on the field-facing side. The laser carrying structure is pivotally connected to the set-up tool. The protractor structure has a laser emitting component which is configured to project a substantially vertical flat blade laser in a direction extending outwardly on the field-facing side of the set-up tool along one of the angular delineations of the protractor.

In this aspect, the set-up tool may also have the first contact member and the second contact member both extending substantially orthogonally from the cross member. The cross member may also be generally straight, and the protractor structure may have a base-line substantially parallel to the cross member. Additionally, in this aspect, the first and second contact members are configured to contact a vehicle and provide a first and second, respectively, contact points, wherein when the set-up tool is centered on the vehicle, the first and second contact points identify/define a transverse axis of the vehicle. The set-up tool is then configured to have the protractor structure having a base-line substantially parallel to the transverse axis of the vehicle.

In this aspect, the laser emitting component may be placed in a reverse, position. When the laser emitting component is in the reverse position, it emits a laser projection of the vertical flat blade laser back toward the vehicle-facing side. This projection may be in a direction substantially 90 degrees off the base-line of the set-up tool or the transverse axis of the vehicle. This projection helps in aiding a user in the centering of the set-up tool in-line with the center line of the vehicle by positioning the set-up tool by transversely transitioning (sliding) it along the front of the vehicle until the laser line lines up with an identified center point, or aligning point, of the vehicle. Most cars are visually symmetrical in the design of the front of the vehicle, and the flat blade laser line may be aligned with a center parting line of a front fascia, bumper, hood, a center point on a vehicle emblem, license plate bracket, front camera or sensor, or any other identified center point of the vehicle. A preferred aligning point on the vehicle may be recommended or specified for the differing makes, models, and trim packages of vehicles.

Once centered, the laser carrying structure may then be pivoted to another angular delineation from 90 degrees to 270 degrees from the reverse, or vehicle-facing side, position. These delineations provide for flat-blade laser lines to extend outwardly from the front center point of a vehicle at known angles allowing for targets or reflecting surfaces to be placed in a number of varying angular offset locations in front of the vehicle. Having the targets placed at differing angular locations in front of a vehicle may allow for testing or recalibrating a single sensor, or an array of sensors, field of view. This may be used to calibrate, recalibrate, or test whether a sensor is aligned correctly in relationship with the vehicle, or in relation to other sensors. This set-up tool may also be used to align sensors on the rear of the vehicle in similar ways.

The set-up tool may also include a target. The target is configured to be placeable along the projected flat blade laser, which is projected along one of the angular delineations of the protractor, on the field-facing side of the set-up tool. The target may also have an alignment component configured to align with the projected flat blade laser. This alignment component may be a visible line on the target, may be a reflector, or may be an electronic device that receives or identifies the projected laser and provides an indication of proper alignment. Indication of proper alignment with the laser may be done with an indicator light on the target.

Another aspect of this disclosure is directed to a set-up tool for aiding vehicle sensor calibrations having a main structure with first and second contact points configured to contact a vehicle. The second contact point is offset from the first contact point and, when in a proper position contacting the vehicle, define a calibration axis. In this aspect, a protractor is connected to the main structure having a base-line substantially parallel to the calibration axis. The protractor provides at least three angular delineations, with one of the three angular delineations being perpendicular to the calibration axis. In this aspect, a line laser projecting device is connected to the main structure and is rotatable on the protractor to project a laser line along each of the angular delineations.

The line laser projecting device of this set-up tool is rotatably connected to the main structure to project a laser line along each of the angular delineations, and it is also reversibly connected to project a laser line in an opposite direction along the same angular delineations. In a first position the line laser projecting device projects a laser line in a direction extending away from the vehicle along one of the angular delineations. In a second position, a reversible position from the first position, the line laser projecting device projects a laser line in a direction toward the vehicle along one of the angular delineations.

When the first and second contact points are in contact with the vehicle, and when the line laser projecting device is in the second position and at an angular delineation perpendicular to the transverse axis, the line laser projecting device projects a laser line that allows a user to visually line up with the set-up tool with a center of a vehicle. Once the set-up tool is orientated with the center line of the vehicle, the laser projecting device is configurable (reversible) to move to the first position and an angular delineation (rotatable) other than the angular delineation which is perpendicular to the transverse axis. This allows for the laser line to extend away from the center point of the vehicle at a discrete angle aiding in the placement of a target used for vehicle sensor calibrations.

The main structure may also have adjustable feet and leveling bubbles. It may be advantageous to locate the vehicle on a reasonably flat surface and to level off the set-up tool for more accurate displayed laser lines. The main structure may have three or more feet, wherein three of the feet, when contacting the ground, provide support to orientate the set-up tool. At least one of the three feet may be vertically adjustable, and in conjunction with at least one leveling bubble, the user may level the set-up tool in at least one direction. If the set-up tool has all three of the feet vertically adjustable, and level bubbles in substantially perpendicular arrangements, the user may level the entire main structure providing for a level plane in reference to gravity. In the case of a substantially vertical flat blade laser line, leveling of the set-up tool may provide for a more truly vertical laser line projection increasing the accuracy of centering of the main structure and a placement of the target.

Accordingly, this other aspect may also include a target. This target is separate from the main structure and configured to be placeable along the projected laser line. The target may also have an alignment component configured to align with the projected laser line. This alignment, component may be a visible line on the target, may be a reflector, or may be an electronic device that receives or identifies the projected laser line and provides an indication of proper alignment. Indication of proper alignment with the laser may be done with an indicator light on the target.

A further aspect of this disclosure is directed to a method of placing a sensor target at an angular offset from a vehicle. First a set-up tool is placed on the ground adjacent a front or rear surface of a vehicle. Then the front or rear surface of the vehicle is contacted with first and second contact points of the set-up tool. These two contact points define a calibration axis. Next a substantially vertical flat blade laser line is projected from the set-up tool on a vehicle-facing side position perpendicular to the calibration axis. This allows for the centering of the set-up tool by aligning the flat blade laser with a center of the front or rear surface. Finally, the laser projecting device is transitioned to project a flat blade laser, in coordination with a protractor providing an angular delineation, along the ground on the field-facing side of the set-up tool.

With this method, a target may be placed along the laser line at a discernable angular delineation. This method may also employ a step of leveling of the set-up tool.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
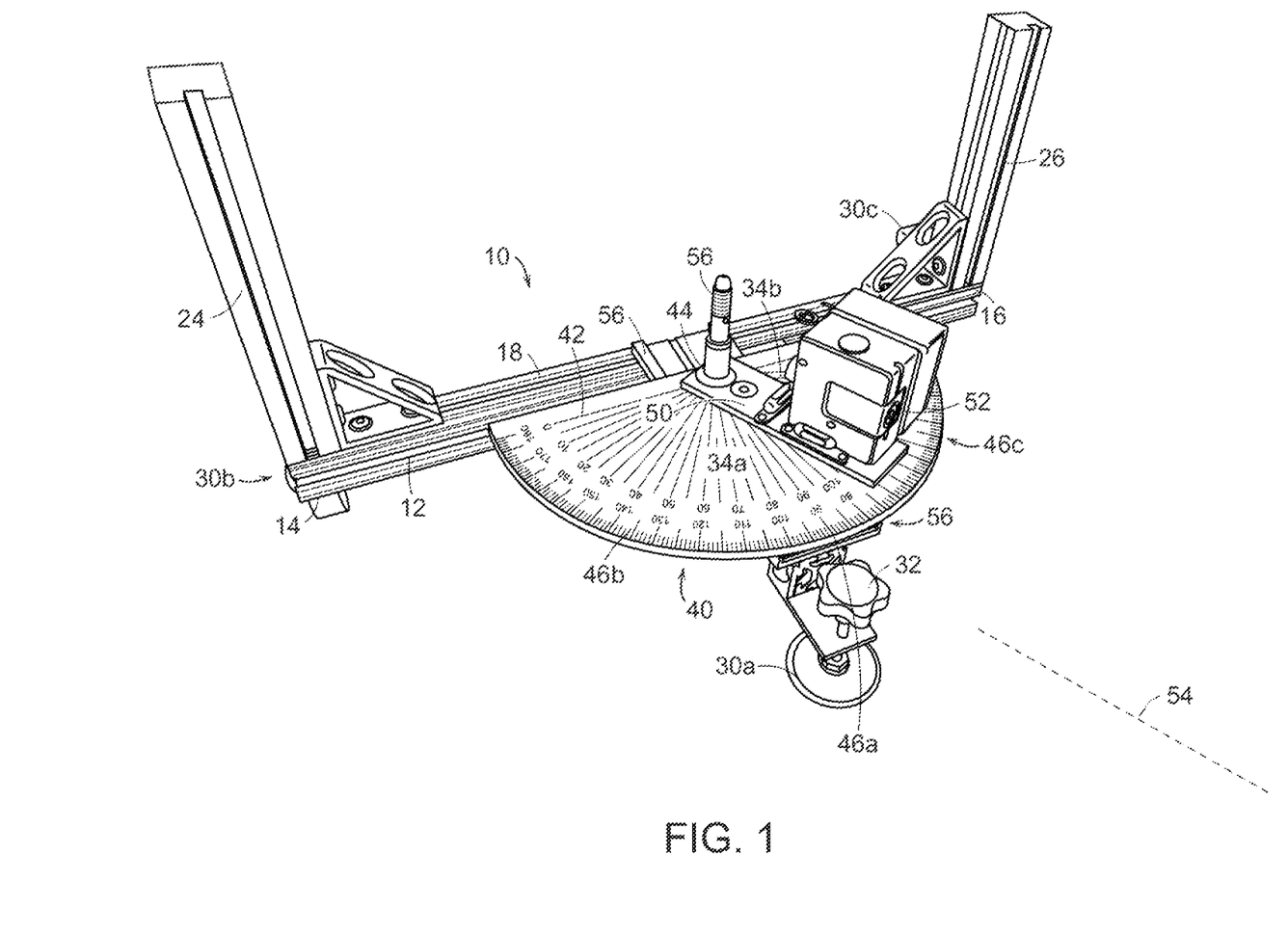
FIG. 1 is a perspective view of a set-up tool showcasing a protractor and a laser projecting along one of the angular delineations of the protractor.

FIG. 1 shows a main structure 10 of a set-up tool. The main structure 10 has a cross member 12 with a first end region 14, a second end region 16, and a center region 18 disposed between the first end region 14 and the second end region 16. In this embodiment the cross member 12 is generally straight, although varying shapes could be used to provide structural support and separation of other components on the main structure 10. The term generally, as applied here to the word straight, means that the cross member does not have to be perfectly straight and standard geometric tolerancing may be applied to the straightness of the cross member.

In this embodiment, a first contact member 24 is shown connectedly extending away from the first end region 14 of the cross member 12. The first contact member 24 is also general straight, although it is envisioned other shapes could be used, and extends substantially orthogonally from the cross member 12. Substantially orthogonally, as used here, means it does not have to be perfectly 90° but can be within standard geometric tolerancing as applied to the field/industry, or between 85° to 95°, whichever is greater. A second contact member 26 is shown connectedly extending away from the second end region 16 of the cross member 12. The second contact member 26 is also generally straight and also extends substantially orthogonally from the cross member 12.

The main structure 10 of this set-up tool has feet 30. In this specific embodiment three adjustable feet 30a, 30b, 30c are shown. Although this embodiment is shown with three adjustable feet 30a, 30b, 30c connected to the main structure 10, embodiments may exist that do not include any adjustability in the feet, or only a single adjustable foot 30. Other embodiments may exist with more than three feet 30, whether adjustable or not, and ally combination in-between. Feet 30a, 30b, 30c are shown adjustable in a vertical direction to allow for leveling of the main structure 10 in a direction of each respective foot 30. The feet 30 in this embodiment use a threaded shaft in connection with a handle 32, similar to that of a valve handle, which when turned raises or lowers the feet 30 in relation to the main structure 10.

Leveling bubbles 34 may be connected to the main structure 10 allowing a user to adjust one of the feet 30 and level the set-up tool in at least one direction. In this embodiment there are shown at least two leveling bubbles 34a, 34b. Leveling bubbles 34a and 34b are aligned substantially orthogonally from each other. A user may adjust the feet 30 until the bubbles become centered within the centering lines of the leveling bubbles 34a, 34b and provide a plane substantially perpendicular to gravity. Substantially, as used here, means within 5° in either direction. Leveling bubbles 34 may be attached to the min structure 10 on fixed components that do not move relative to most of the main structure, such as the cross member 12, or first and second contact members 24, 26, or leveling bubbles 34 may be attached to structure that may move, as is shown here. It may be advantageous to place a first leveling bubble 34a substantially parallel to a projected laser 54 (see below) and a second leveling bubble 34b substantially perpendicular to the projected laser 54. A third leveling bubble (not shown) may also be utilized, the third leveling bubble may be orthogonal to both the first and second leveling bubbles 34a, 34b.

A protractor structure 40 is connected to the main structure 10. The protractor 40 is substantially centered on the center region 18 of the cross member 12. Substantially centered, as used here, means the center of the protractor is within +/−5 cm of the center of the cross member 12. The protractor 40 has a base-line 42. The base-line 42 is substantially parallel to the cross member 12. Substantially parallel, as used here, means within 5° in either direction. The protractor structure 40 has a center point 44 and a number of angular delineations 46 extending outwardly from the center point 44. The center point 44, as the name implies, is also substantially centered on the protractor structure 40 and thus the cross member 12. Substantially centered, as used here also, means the center point is within +/−5 cm of the center of protractor structure 40 or the cross member 12. Angular delineations 46 may have a first angular delineation 46a at substantially 90° from the base-line 42, a second angular delineation 46b substantially 0° from the base-line 42, and a third angular delineation 46c at substantially 180° from the base-line 42, i.e., directions straight forward, and directly to the left and right of the main structure 10. Substantially, as used here in reference to angular delineations, means within +/−2°. Second and third angular delineations 46b, 46c may also be at 45° and 135°, or any other delineation as desired. The protractor 40 may also have 180 distinct and separate measurable angular delineations 46, as shown here in FIG. 1.

Additionally, a laser carrying structure 50, or a line laser projecting device 50, is pivotally connected to the main structure 10, and preferably connected to the protractor structure 40. The laser structure/device 50 has a laser emitting component 52 which emits a laser 54, or other visible directional light source. The laser structure/device 50 is pivotally connected in such a way that the emitted laser 54 tracks from the center point 44 and outwardly along one of the angular delineations 46 of the protractor 40. Thus the pivot point of the laser structure/device 50 may be at the center point 44 of the protractor 40. The laser structure/device 50 may have locking detents to structurally align with the angular delineations 46 on the protractor 40 to lock into a specific angle.

The laser emitting component 52 may emit a flat blade laser 54, which essentially emits a flat V shaped light outwardly from the lens (best seen in FIGS. 2 and 3), however a pin-point laser angled toward the floor may also be used, or any other light projecting device or type to allow for a visual line to be seen on a floor or ground for a reasonable distance away from the main structure 10 under normal daylight conditions. Preferably, the projected laser line 54 is a flat beam laser line that projects a substantially vertical flat beam laser in reference to the plane provided by the leveling bubbles 34.

Figure 2:
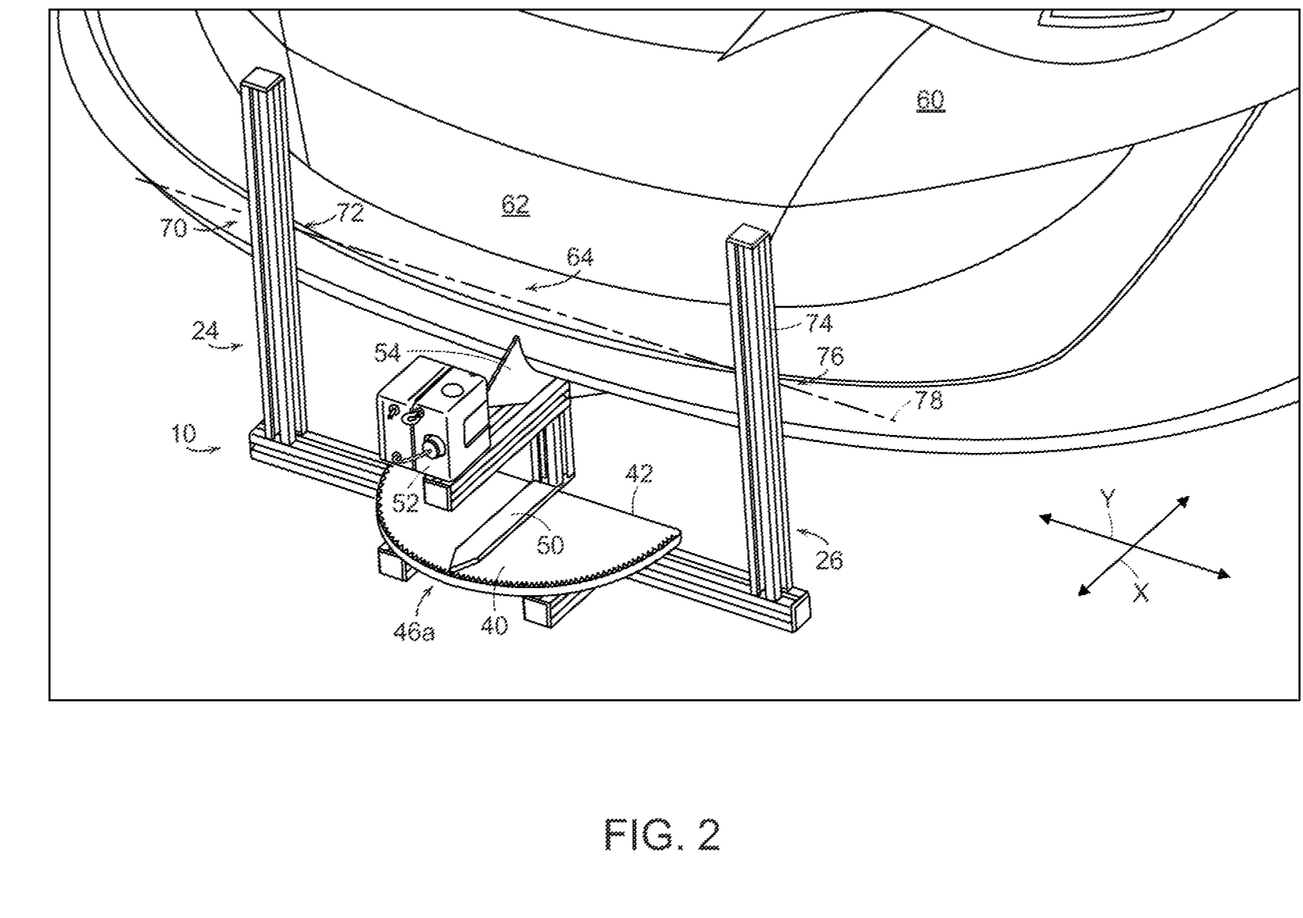
FIG. 2 is a front view of a set-up tool projecting a line laser in a second position, or a reversible position, toward a vehicle for centering the set-up tool on the vehicle.

The laser emitting component 52 is also reversibly connected relative to the laser structure/device 50, such that it may emit a laser line 54 outwardly along any angular delineation 46, or it may be reversed such that it emits a laser line 54 in the opposite direction along any angular delineation 46. For sake of clarity, however, in FIG. 1 the laser emitting component 52 is shown in the forward position, and FIG. 2 shows it in the reverse position. This reversibility of the emitted laser line 54 aids in the aligning of the main structure 10 with an automobile. Accordingly, when the laser structure/device 50 is pivoted to a 90° angular delineation 46a on the protractor 40, and the laser emitting component 52 is in the reverse position, a vertical flat blade laser may be emitted to visually aid with the centering of the main structure with the front or rear of a vehicle.

A second laser 56 may also be connected to the main structure 10. The second laser 56 may be a pin-point laser connected to the protracting structure 40, or the laser structure/device 50, configured to extend a second laser line (not shown) in a substantially vertical direction from the center point 44. The protracting structure 40, and the laser structure/device 50, may be connected to the main structure 40 via a track 58. Track 58 may extend substantially orthogonally from the cross member 12 and allow movement of the protracting structure 40 along track 58. The track 58, or carriage allows for the base-line 42 and center point 44 of the protractor 40 to move substantially orthogonally with respect to the cross member 12 and the first and second contact members 24, 26. This allows for a user to align the main structure 10 with reference to a vehicle 60 (see FIGS. 2-5), and use the second laser 56 to move the protractor structure 40 forward or aft to align the base-line 42, and specifically the center point 44, with an outward most edge of the vehicle.

FIG. 2 shows the main structure 10 immediately adjacent, and in contact with, a vehicle 60. In this example, the main structure 10 is in front of a front fascia 62 of the vehicle 60. The vehicle 60 has a longitudinal axis X that runs from the front to the rear of the vehicle 60. The vehicle 60 also has a transverse axis Y that is orthogonal to the longitudinal axis X and runs across the vehicle, e.g., in the direction of an axle of the vehicle. The vehicle 60 also has a center-line (represented by a parting line 64 in fascia 62). It should be rioted that each make, model, year, and sometimes packages of vehicles will all have differing shapes and features of the body and specifically the fascia, however a visual indicator, such as that of a parting line, an emblem, a measured ½ way distance of a grill, or any other indicator may be chosen to represent the center-line of a vehicle. Manufacturers may wish to instruct a user the best way to determine a visual representation of the center-line 64 of the vehicle.

In this example, the first contact member 24 has a first portion 70 configured to contact the vehicle 60. In this case the first portion 70 contacts the right side of the front fascia 62 and provides the first contact point 72. A second portion 74 of the second contact member 26 is configured to contact the vehicle 60, in this case the left side of the front fascia 62, and provide a second contact point 76 which is offset from the first contact point 72. The main structure 10 is then centered on the vehicle 60 by visually aligning the emitted laser line 54 with the vehicle's visual indicator of its center-line 64, in this case the parting line 64. This is accomplished by pivoting the laser structure/device 50 to a 90° angular delineation 46a and rotating the laser emitting component 52 to the reverse position. Now an emitted laser line 54, in this example a vertical flat blade laser line 54, is emitted from the center-line of the main structure 10 of the set-up tool toward the vehicle 60.

The first and second contact points 72, 76 define a calibration axis of the vehicle when the set-up tool is centered on the vehicle 60. The calibration axis is substantially parallel to the transverse axis Y of the vehicle 60. As well, the calibration axis is substantially parallel to the base-line 42 of the protractor 40, thus making the base-line 42 of the protractor 40 substantially parallel to the transverse axis X of the vehicle 60 as well. With the protractor 40 centered on the vehicle 60 and the base-line 42 parallel to the transverse axis X of the vehicle 60, allows a user to rotate the laser emitter 52 and emit a laser line 54 at any desired angular delineation from the front center of the vehicle forward. It should be appreciated that this also may be done from the rear of a vehicle or any side surface where a field of vision of a sensor is to be checked. Utilizing the leveling bubbles 34 (see FIG. 1), as described above, also allows a user to place the protractor 40 in a plane substantially perpendicular to gravity, which provides for better accuracy.

Figure 3:
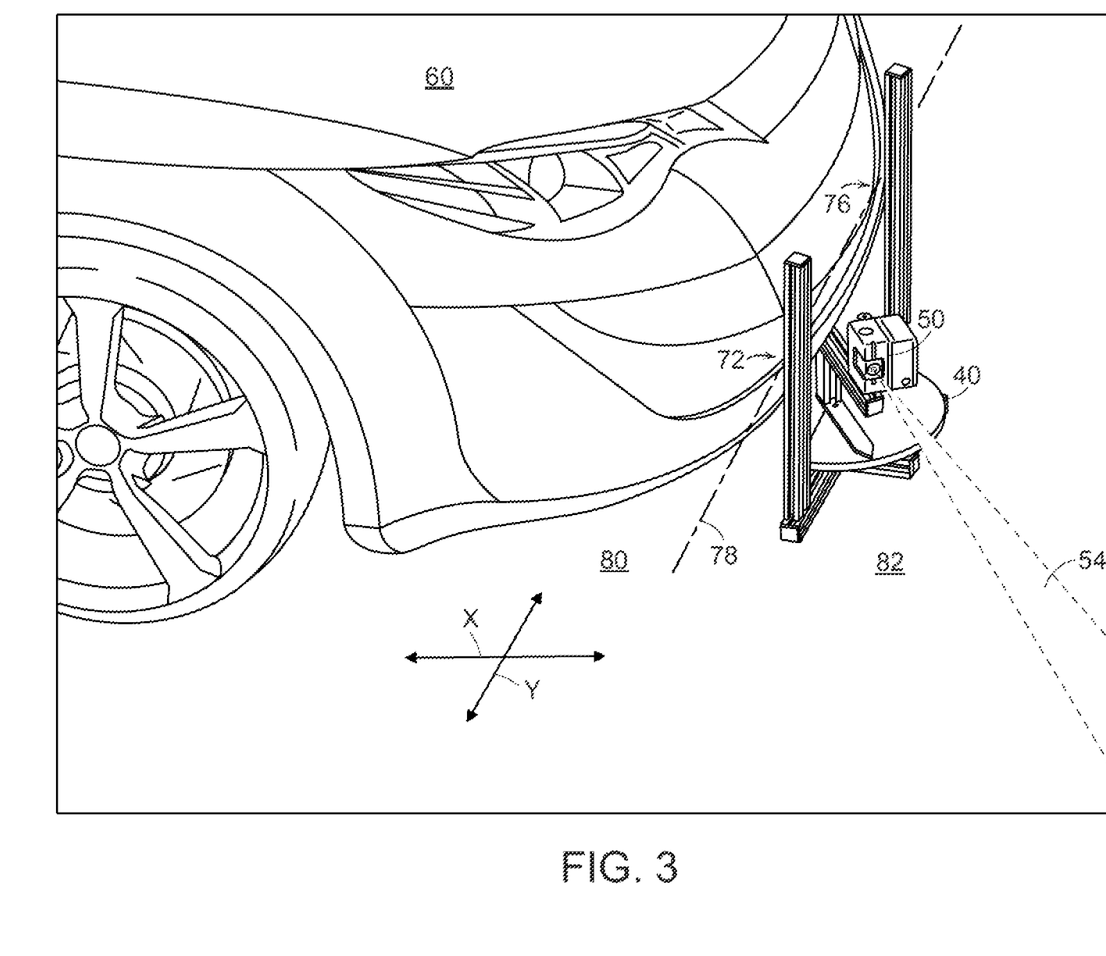
FIG. 3 is a side view of a set-up tool projecting a line laser in a first position at a discrete angular delineation away from a vehicle.
Figure 4:
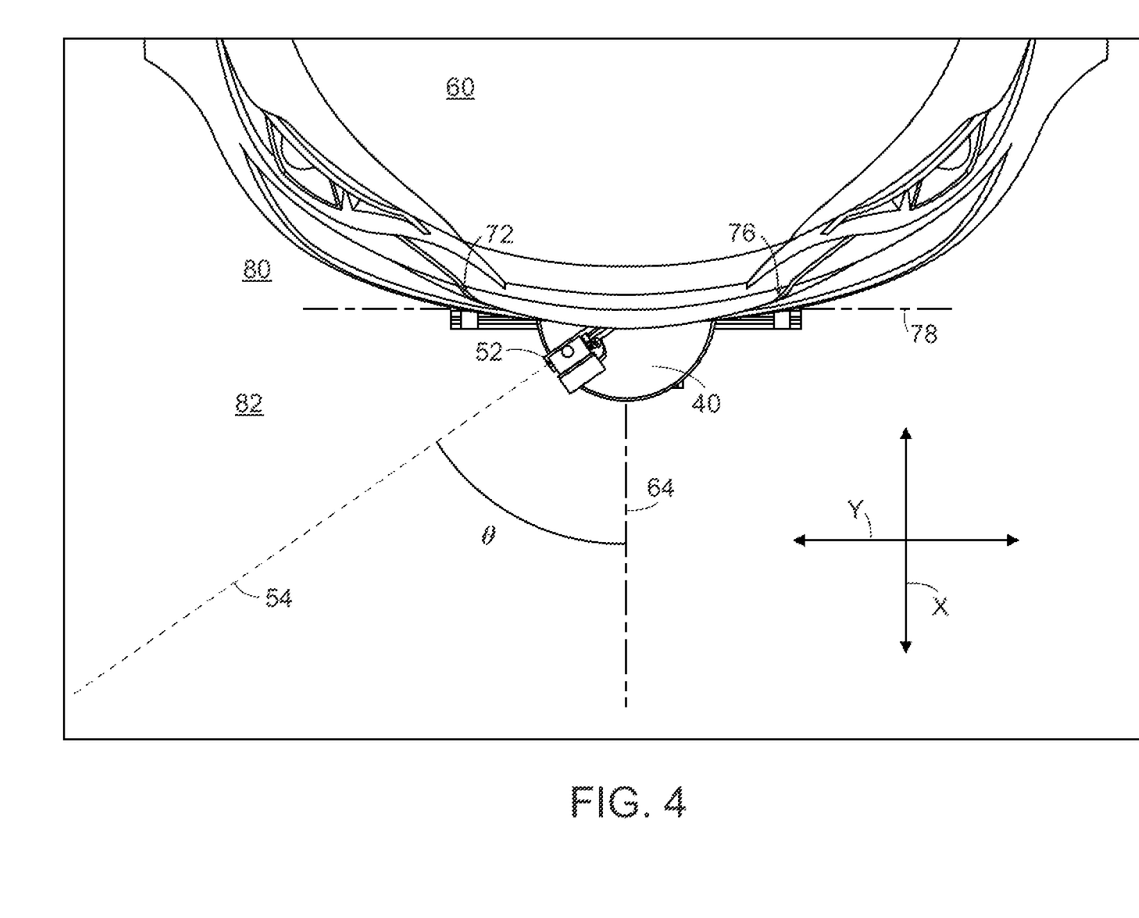
FIG. 4 is a top view of a set-up tool projecting a line laser in a first position at a discrete angular delineation away from a vehicle.

FIGS. 3 and 4 show the set-up tool leveled (on plane), centered, and contacting the first and second contact points 72, 76 of the vehicle defining a calibration axis 78 substantially parallel to the transverse axis Y. In this position a number of other aspects become defined. The first and second contact members 24, 26 are configured to contact the vehicle 60 (at first and second contact points 72, 76) on a same side of the cross member 12 defining a vehicle-facing side 80 of the set-up tool. Opposite the vehicle-facing side 80 of the set-up tool is a field-facing side 82.

In this configuration, the base-line 42 of the protractor 40 is substantially parallel to the calibration axis 78 which is also substantially parallel to the transverse axis Y of the vehicle 60. The center point 44 of the protractor 40 is substantially in-line with the center-line 64 of the vehicle 60. The protractor 40 has a number of measurable angular delineations 46 from the center point 44 extending outwardly on the field-facing side 82, and in the set-up tools simplest form, it would have at least three of these angular delineations. One of the three angular delineations 46 being perpendicular to the calibration axis 78, or in-line with the center-line 64 of the vehicle. This angular delineation may be referred to as 90° from the base-line 42 on the protractor 40. The protractor 40 may then have a second angular delineation identified as the outer-edge of the field of view of a sensor; this angular delineation may be referred to as θ.

The laser structure/device is pivoted to angle θ on the protractor structure 40, and the laser emitting component 52 in a forward position, projects a substantially vertical flat blade laser 54 in a direction extending outwardly on the field-facing side 82 of the set-up tool along angle θ. Many modern vehicles have sensors that are located in various places around the vehicle to aid in the operation of the vehicle. These sensors may be proximity sensors or optical sensors that scan the areas around the vehicle to detect objects. The sensors, being physical in nature, must be attached to the vehicle and calibrated to have a proper field of view around the vehicle. The field of view of the sensor may be tested with a target set at a certain distance and angle of the center-line from the front of the vehicle.

Figure 5:
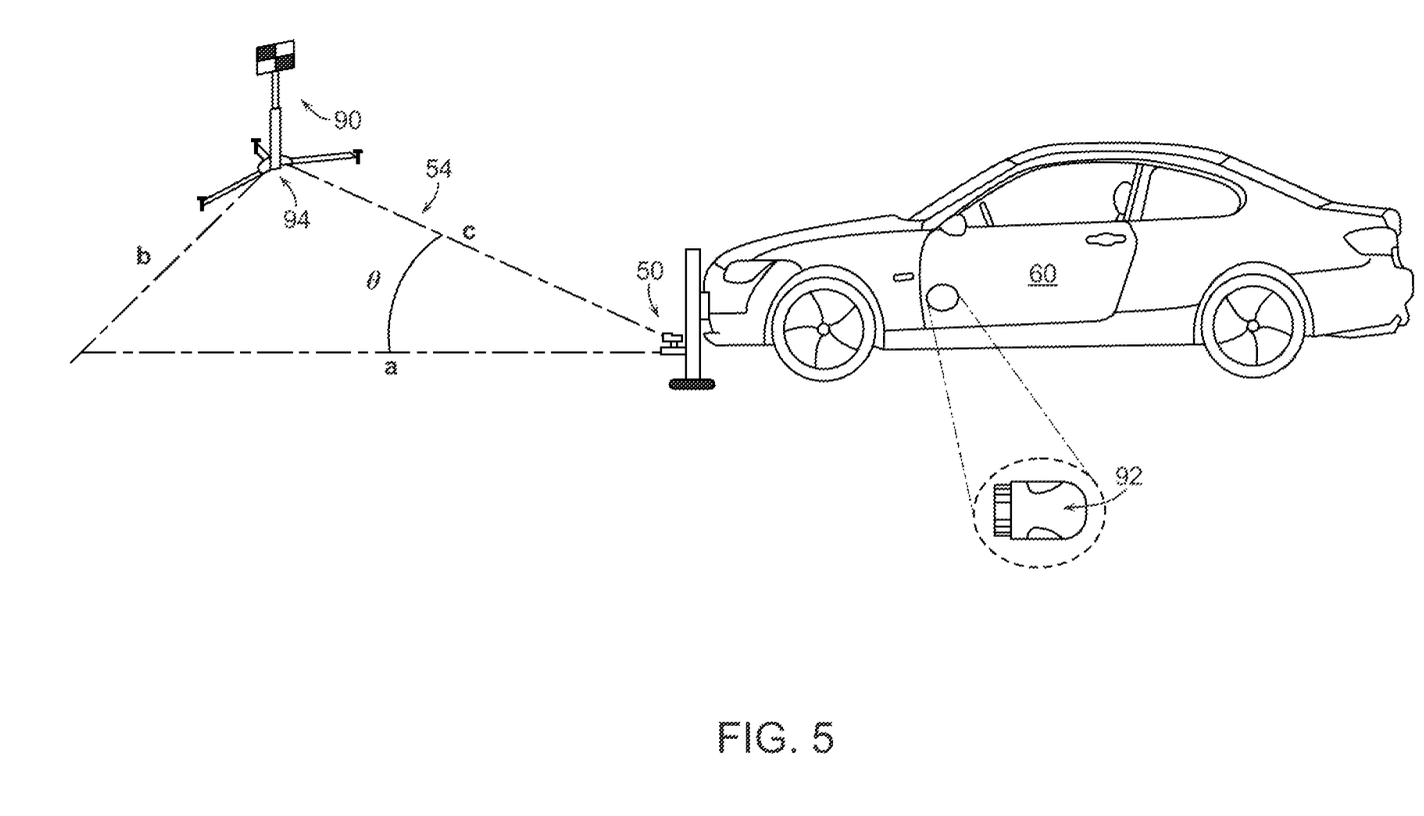
FIG. 5 is a side perspective view showing a laser line being projected away from front of a vehicle at a discrete angle with a target placed along the laser line.

FIG. 5 shows a target 90. Target 90 is separate from the main structure 10. The target 90 is configured to be placeable along the projected laser 54. The target 90 may have a specified distance c that it is placed along the laser line 54. The target 90 may have an alignment component 94 configured to align with the projected laser line flat blade laser 54. The alignment component 94 may be a line, etching, or an electronic laser receiving device that will indicate when the receiving lens is in-line with the laser 54. A set-up tool may work in conjunction with a recalibration or testing device (not shown) that accesses the vehicle's computer/diagnostic system thru the OBDII port, or other equivalent structure. A wireless dongle 92 may be plugged into the OBDII port and in conjunction with an electronic diagnostic tool, a sensor may be tested.

The sensor may be placed in a mode for testing such that the target 90 may be placed at certain angles in front of the vehicle 60, and if the sensor can see the target 90 then it is within specification. If the sensor cannot see the target 90, then the sensor may need replacing or modification. Accordingly, once the set-up tool is orientated, the laser projecting device 50 is configurable to move to an angular delineation to provide a laser line 54 extending at a discrete angle from the front of the vehicle 60 aiding in the placement of a target 90 used for vehicle sensor calibrations.

Figure 6:
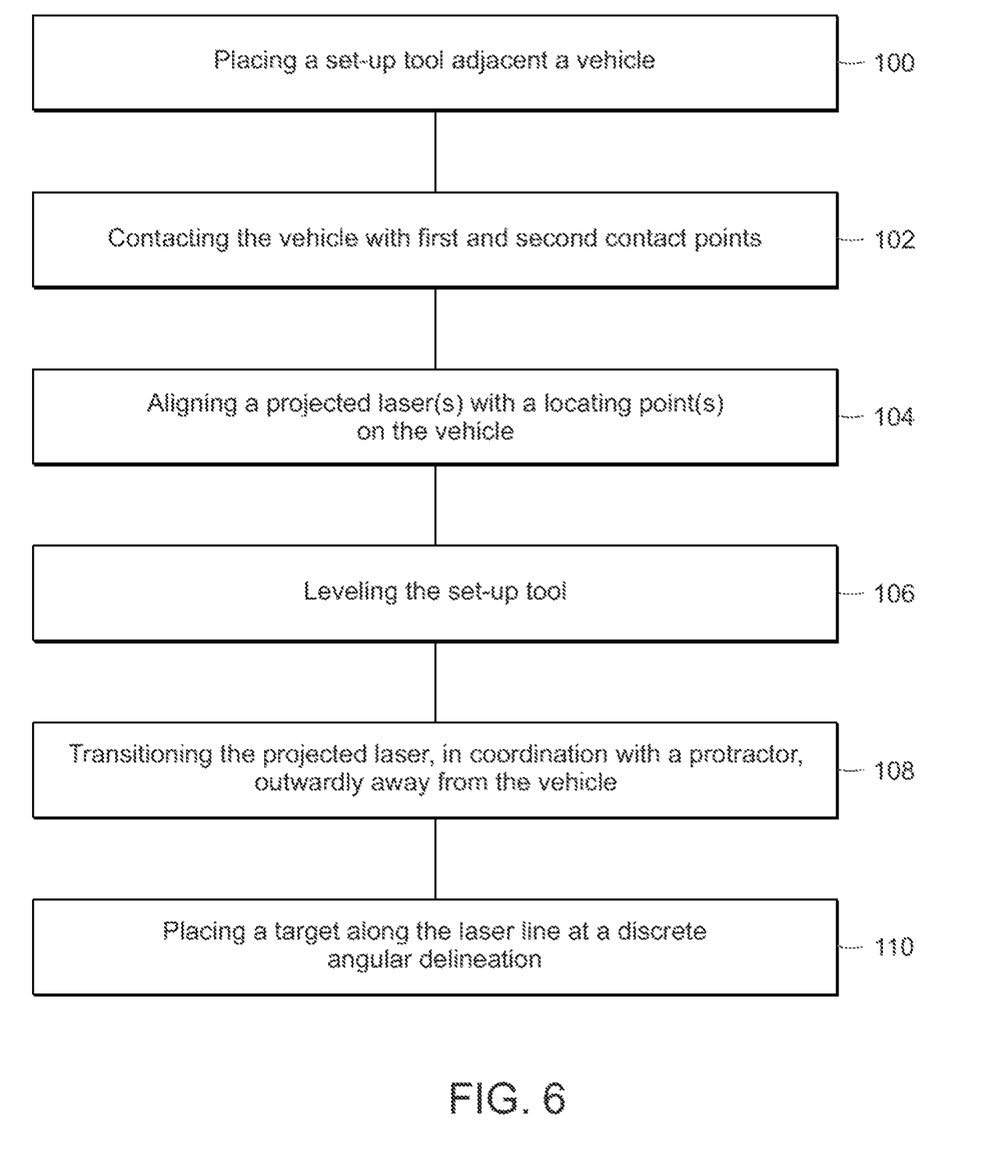
FIG. 6 is a flowchart illustrating an example of setting up a target in front of a vehicle at a known angle utilizing a set-up tool as described hi this specification.

FIG. 6 is a flowchart illustrating an example of a method of placing a sensor target at an angular offset from a vehicle.

A first step 100 consists of placing a set-up tool adjacent a vehicle. Preferably on the ground adjacent a front or rear surface of a vehicle. Step two 102 of this example requires contacting the vehicle with first and second contact points. By contacting the vehicle with first and second contact points, the set-up tool defines a calibration axis extending between the two contact points.

The third step 104 in this flow chart includes aligning a projected laser with a locating point on the vehicle. In the scenario of being a front or rear surface of a vehicle, this may be accomplished by placing a substantially vertical flat blade laser line projecting device in a vehicle-facing side position perpendicular to the calibration axis, and then visually aligning the laser with a center point of the vehicle.

Another alignment in this step 104, or a partial step, may include moving of the protractor relative the main structure of the set-up tool. It is preferable to move the protractor while maintaining the base-line of the protractor substantially parallel to the calibration axis during the movement. During this movement, a second substantially vertically projected laser may be utilized to align a center point of the protractor with a second point on the vehicle. The desired second point on the vehicle may be an outwardest most edge or profile of the vehicle. This partial step may be performed at any time in the method, however performing this step either directly before, after, or simultaneously with step 104 is most preferable.

The fourth step 106 of this example includes leveling of the set-up tool. Once centered and leveled, the calibration axis is substantially parallel with a transverse axis of the vehicle, and the set-up tool has a protractor with a base-line substantially parallel to the calibration axis and the transverse axis with a center point at the center of the vehicle as well. This provides for the protractor to provide angular delineations of the centerline of the vehicle. It may be more desirable to perform step 106 before step 104, or an iterative approach may be needed as performing step 104 may require re-leveling. In any event, steps 102-106 may be performed in differing orders.

Now the method provides a fifth step 108 which allows for the transitioning of the laser projecting device to project a laser line, in coordination with a protractor providing an angular delineation, along the ground on the field-facing side of the set-up tool. The laser line may be provided by a substantially vertical flat beam laser line. The final step 110 of this example is the placing of a target along the laser line at a known angular delineation. The placement of this target supports the checking calibration, recalibration, or repair of sensors on vehicles which are used to detect objects adjacent a vehicle.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A set-up tool for aiding vehicle sensor calibrations, comprising:
   a cross member having a center region disposed between a first end region and a second end region;
   a first contact member connectedly extending away from the first end region of the cross member, the first contact member having a first portion configured to contact a vehicle;
   a second contact member connectedly extending away from the second end region of the cross member, the second contact member having a second portion configured to contact the vehicle, wherein the first and second contact members are configured to contact the vehicle on a same side of the cross member defining a vehicle-facing side of the set-up tool and a field-facing side opposite the vehicle-facing side of the set-up tool;
   a protractor structure substantially centered on the center region of the cross member having a center point, the protractor structure providing measurable angular delineation from the center point outwardly on the field-facing side; and
   a laser carrying structure pivotally connected to the set-up tool and in coordination with the protractor structure having a laser emitting component configured to project a substantially vertical flat blade laser in a direction extending outwardly on the field-dicing side of the set-up tool along one of the angular delineations of the protractor.

2. The set-up tool of claim 1, wherein the first contact member and the second contact member both extend substantially orthogonally from the cross member.

3. The set-up tool of claim 1, wherein the cross member is generally straight, and the protractor structure has a base-line substantially parallel to the cross member.

4. The set-up tool of claim 1, wherein the first contact member is configured to contact a vehicle and provide a first contact point and the second contact member is configured to contact the vehicle and provide a second contact point, and wherein when the set-up tool is centered on the vehicle, the first and second contact points define a transverse axis of the vehicle, and the protractor structure has a base-line substantially parallel to the transverse axis of the vehicle.

5. The set-up tool of claim 1, wherein the laser emitting component is further configured to be placed in a reverse position to reverse the direction of the projection of the substantially vertical flat blade laser back toward the vehicle facing side.

6. The set-up tool of claim 5, wherein when the laser carrying structure is pivoted to a 90 degree angular delineation, and the laser emitting component is in the reverse position, the vertical flat blade laser is configured to be visually aligned with a center of the vehicle.

7. The set-up tool of claim 1 further comprising a target, wherein the target is configured to be placeable along the projected flat blade laser, which is projected along one of the angular delineations of the protractor, on the field-facing side of the set-up tool.

8. The set-up tool of claim 7, wherein the target further comprises an alignment component configured to align with the projected flat blade laser.

9. A set-up tool for aiding vehicle sensor calibrations, comprising:
   a main structure having a first contact point configured to contact a vehicle, a second contact point offset from the first contact point, the second contact point also configured to contact a vehicle, the first and second contact points defining a calibration axis;
   a protractor connected to the main structure having a base-line substantially parallel to the calibration axis, and at least three angular delineations, one of the three angular delineations being perpendicular to the calibration axis;

a line laser projecting device connected to the main structure in coordination with the protractor to project a laser line along one of the at least three angular delineations.

10. The set-up tool of claim 9, wherein the line laser projecting device is reversibly connected to the main structure having a first position to project a laser line in a direction extending away from the vehicle along one of the at least three angular delineations, and a second position to project a laser line in a direction toward the vehicle along one of the at least three angular delineations.

11. The set-up tool of claim 10, wherein when the first and second contact points are in contact with the vehicle, and when the line laser projecting device is in the second position and at an angular delineation perpendicular to a transverse axis, the line laser projecting device projects a laser line that can be visually lined up with the center of a vehicle providing an orientating of the main structure.

12. The set-up tool of claim 11, wherein once the main structure is orientated, the laser projecting device is configurable to move to the first position to provide a laser line extending at a discrete angle from a front of the vehicle aiding in placement of a target used for vehicle sensor calibrations.

13. The set-up tool of claim 9 further comprising at least three feet connected to the main structure, wherein at least one of the feet is adjustable in a vertical direction to allow for partial leveling of the main structure.

14. The set-up tool of claim 13 further comprising a leveling bubble connected to the main structure configured to allow a user to adjust one of the feet and level the main structure in at least one direction.

15. The set-up tool of claim 13 wherein at least three of the feet are adjustable in a vertical direction, and further comprising at least two leveling bubbles connected to the main structure allowing a user to adjust the three feet a provide a plane substantially perpendicular to gravity, and wherein the projected laser line is a flat beam laser line that projects a substantially vertical flat beam laser in reference to the plane.

16. The set-up tool of claim 9 further comprising a target separate from the main structure, wherein the target is configured to be placeable along the projected laser line.

17. The set-up tool of claim 16, wherein the target further comprises an alignment component configured to align with the projected laser line.

18. A method of placing a sensor target at an angular offset from a vehicle, comprising the steps of:

placing a set-up tool on the ground adjacent a front or rear surface of a vehicle;

contacting the front or rear surface of the vehicle with first and second contact points of the set-up tool defining a calibration axis;

placing a substantially vertical flat blade laser line projecting device in a vehicle-facing side position perpendicular to the calibration axis;

centering the set-up tool by aligning the flat blade laser with a center of the front or rear surface; and transitioning the laser projecting device to project the flat blade laser, in coordination with a protractor providing an angular delineation, along the ground on a field-facing side of the set-up tool.

19. The method of claim 18, further comprising the step of:

placing a target along the laser line at that angular delineation.

20. The method of claim 18, further comprising the step of:

leveling the set-up tool.

* * * * *